United States Patent [19]

McGregor

[11] Patent Number: 5,471,611

[45] Date of Patent: Nov. 28, 1995

[54] COMPUTERISED INFORMATION-RETRIEVAL DATABASE SYSTEMS

[75] Inventor: Douglas R. McGregor, Clarkston, United Kingdom

[73] Assignee: University of Strathclyde, Glasgow, United Kingdom

[21] Appl. No.: 117,106

[22] PCT Filed: Mar. 12, 1992

[86] PCT No.: PCT/GB92/00446

§ 371 Date: Sep. 10, 1993

§ 102(e) Date: Sep. 10, 1993

[87] PCT Pub. No.: WO92/16906

PCT Pub. Date: Oct. 1, 1992

[30] Foreign Application Priority Data

Mar. 13, 1991 [GB] United Kingdom .................... 9105367

[51] Int. Cl.$^6$ .................................................. G06F 17/30
[52] U.S. Cl. .................... 395/600; 364/419.08; 395/51
[58] Field of Search ................ 364/419.08, 419.19; 395/10, 12, 51, 52, 600

[56] References Cited

U.S. PATENT DOCUMENTS

| | | | |
|---|---|---|---|
| 4,606,002 | 8/1986 | Waisman et al. | 395/600 |
| 5,201,046 | 4/1993 | Goldberg et al. | 395/600 |
| 5,295,261 | 3/1994 | Simonetti | 395/600 |

OTHER PUBLICATIONS

"Automatic Logical Navigation Among Relations Using Steiner Trees", Dept. of Computing Science, pp. 582–588, 1989.

"Resolving the Query Inference Problem Using Steiner Trees", by Joseph A. Wald & Paul G. Sorenson, pp. 348–368, Sep. 1984.

Primary Examiner—David M. Huntley
Assistant Examiner—Stephen R. Tkacs
Attorney, Agent, or Firm—Bell, Seltzer, Park & Gibson

[57] ABSTRACT

An information-retrieval system comprises a workstation having an input device and an output device. The workstation is connected to an intelligent interface which in turn is connected to a date base memory system. The interface comprises a lexical analyzer, a semantic associator, a query code generator and an output formatter. The user inputs a query as an ordered stream of characters in natural language (e.g., English or German). The lexical analyzer partitions the character stream into sections which are then compared with and matched against the contents of a look-up table held in a local memory and if a match is located, converted to a single token record for transmission to the Semantic Associator. Associator stores all the node/link records and those corresponding to the received tokens are identified to form the initial starting point of the conceptual graph which is operated on by a Steiner Marcher within Associator in order to identify the Steiner Tree which is then interpreted link by link by the code generator. The query in coded form is then delivered to the DBMS which delivers its consequential output to the formatter which formats the answer to the query for presentation to the user on the display device.

2 Claims, 2 Drawing Sheets

COMPUTERISED INFORMATION-RETRIEVAL DATABASE SYSTEMS

MICROFICHE APPENDIX

A Microfiche Appendix is included as part of this patent application. The Microfiche Appendix has two microfiche having a total of 174 frames of computer program listings.

1. Field of the Invention

This invention relates to the retrieval of information from database systems.

2. Background of the Invention

Query languages for database systems are already known, falling into two broad classes. In one class the user is required to input a query requesting retrieval of information stored in a computer memory database system in a specialized formal computer language (such as SQL or QUEL) in which case the user is restricted to that group of persons conversant with the relevant formal computer language. In the second class the user may use his own natural language to input his query and in this case the database system incorporates an "intelligent interface" to transform the natural language query to the relevant formal computer language.

Unfortunately, when a user is free to present a particular query in his own natural language he can do so in a variety of different ways each of which the user perceives as being correct. Due to volume, it is not a practical matter for the "intelligent interface" simply to store in memory each possible query and each possible manner of presentation of each query to provide a corresponding codified output to the remainder of the computer memory system. For a wide range of problems however, and in semantic terms for a particular query, each manner of presentation contains in common a list of items of interest to the user and which are also contained in the computer memory system, and if these items are mapped onto the schema (the nodes of a conceptual graph representing the database) the shortest possible connection, having the minimum total length, effectively represents the query. The problem of finding the shortest connection is known as the Steiner Problem in Graphs and the answer (being the shortest connection) is known as the Steiner Tree. Identification of the Steiner Tree is known to be a problem of great computational complexity because it is exponential with the number of nodes in the query set, and with the square of the number of nodes in the database. A known form of "intelligent interface" as described in the article entitled "Resolving the Query Inference Problem using Steiner Trees" by J. A. Wald and P. G. Sorenson, published in ACM Transactions on Database Systems, Vol.9, No. 3, September 1984, incorporates a means of solving the Steiner Problem only where the conceptual graph is restricted in extent.

OBJECT AND SUMMARY OF THE INVENTION

It is an object of the present invention to provide a computer system for retrieving information from a database and having a new and improved means of solving the Steiner Problem.

According to the present invention there is provided a computer system for retrieving data stored in a database. The computer system has an input device arranged to input a natural language query from a user thereof, an intelligent interface device connected to the input device to responsively transform a natural language query received from the input device to a formal computer language of the computer system, the intelligent interface device being arranged to connect to a database and having means for solving a Steiner Problem wherein a conceptual graph representing a database is unrestricted, and means for transmitting data representative of a Steiner Tree to a database. The Steiner Problem solving means of the intelligent interface device includes means for identifying N nodes in a query set, means in communication with the identifying means for storing a collection of N triple-part markers at each node of a conceptual graph of a database, each of the N triple-part markers including a first-part having an initial node identity, a second-part having an indication of cost to the triple-part marker in traversing between adjacent nodes, and a third-part having a pointer to a link between adjacent nodes immediately and previously traversed by the triple-part marker, and wherein the collection of N triple-part markers initially comprises N triple-part markers having the first-part identifying each of the N nodes, the respective the second-part and the third-part for N-1 of the N triple-part markers being an undefined value, and a remaining triple-part marker of the N triple-part markers having the respective the second-part and the third-part thereof set to zero, the remaining triple-part marker having an initial node identity identifying the node at which the collection is stored, means in communication with each node for storing global values which are available to each node, the global values being a node identifier to identify a current root of that node with all the second-parts being defined wherein the accumulated value for the second-part of the triple-part marker is a current minimum, means in communication with the global value storing means for initializing the current root of the identified node to null and for initializing the current minimum of the second-part of the triple-part marker to a maximum value, means in communication with each of the nodes for transmitting data messages from each of the nodes to each immediately adjacent node via respective links therebetween and having a traverse cost of which is proportional to a length of the respective links, means at each adjacent node in communication with the transmitting means for receiving the data messages, each received data message containing a duplicate of all the triple-part markers stored in a transmitting node with respective the second-parts of the triple-part markers equal to a previous cost of the second-part markers and with respective the third-parts of the triple-part markers identifying the link traversed by that marker, means in communication with the receiving means and the marker storing means for iteratively comparing received and stored triple-part markers responsive to an initial node identity, the comparison being between the respective second-parts of the triple-part markers to identify and discard those received triple-part markers of greater cost than the stored triple-part markers, other than when the second-part of the stored triple-part marker is undefined, and with a predetermined number of received triple-part markers in each iterative comparison equally sharing an additional traverse cost of a particular link, and for storing a collection of N markers which are respectively of least defined cost responsive to termination of an iteration, means in communication with the comparing means for updating the current minimum and the current root when any one node has N triple-part markers each having a defined second-part and having an aggregate cost value less than the previously stored value of the current minimum, means for initiating data message transmission from a node on each occurrence of a change in a stored collection of triple-part markers at that node and when that node has an accumulated cost value less than the current minimum, means in communication with the initiating means for identifying when message transmission has been completed for every node, and means in communication with the completed message identifying means for tracing the traverse of each triple-part marker in a finally identified current root node back to an originating node in order to determine a Steiner Tree.

By virtue of the present invention identification of the Steiner Tree is solved at least to provide an approximately accurate answer with substantially reduced computational complexity so that access to a database is achieved substantially quicker than hitherto, with substantially less computational power, and independently of the size of the database. A computer system according to the present invention may also have the third-part of the triple-part marker of the marker storing means initially being zero and the second-part of a triple-part marker of the marker storing means initially being a comparatively corresponding large value.

DESCRIPTION OF A PREFERRED EMBODIMENT

Figure 1:
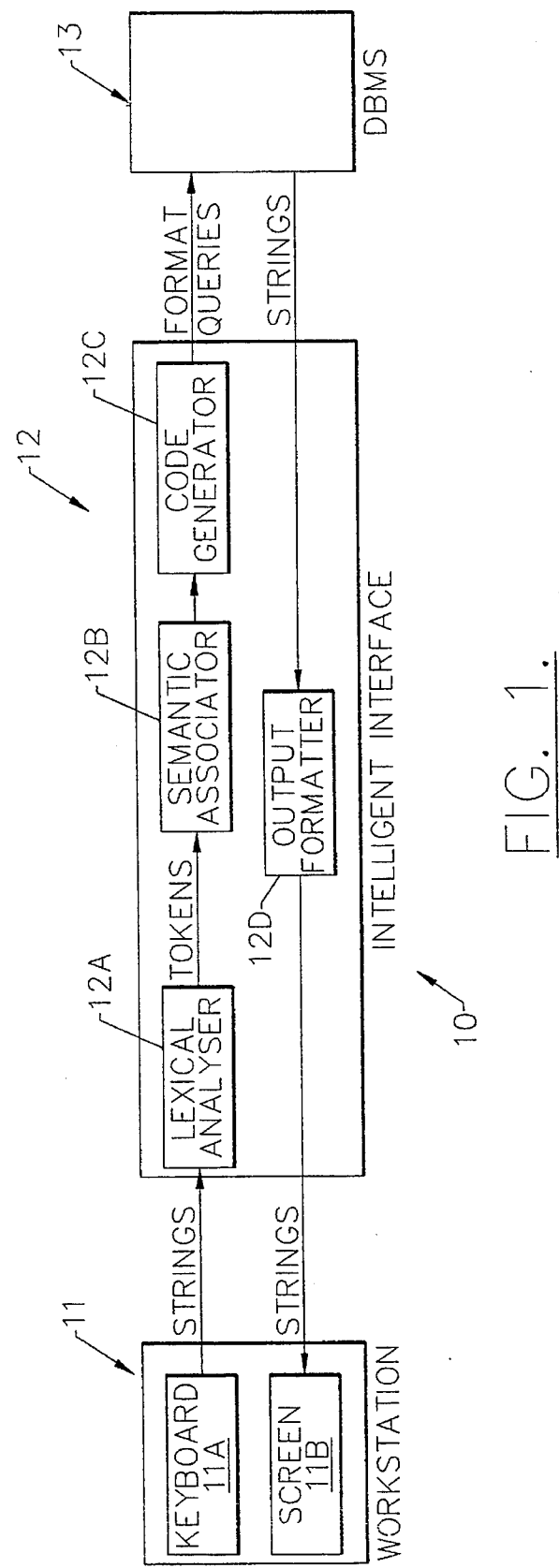
FIG. 1 schematically illustrates a computer system for retrieving data from a database according to the present invention.

A computer memory information-retrieval system 10 is schematically illustrated in FIG. 1 and comprises a workstation 11 having an input device 11A and an output device 11B. The workstation 11 is connected to an intelligent interface 12 which in turn is connected to a date base memory system 13. The interface 12 comprises a lexical analyzer 12A, a semantic associator 12B, a query code generator 12C and an output formatter 12D.

The user operates at the workstation 11 by inputing a query via the keyboard input device 11A as an ordered stream of characters in natural language (e.g., English or German). The lexical analyzer 12A partitions the character stream into sections consisting of word streams and, if appropriate, number streams. The word streams (which may be multi-word phrases or single words) are then compared with and matched against the contents of a look-up table held in a local memory and if a match is located, converted to a single token record for transmission to the Semantic Associator 12B. In the absence of a match, the analyzer 12A attempts an approximate match according to predetermined known rules to produce an appropriate token and if this fails the system displays a suitable legend on the workstation visual display device or screen 11B requesting the user to try again with different language. When the complete character stream has been converted to tokens these are passed to Semantic Associator 12B where all the node/link records are stored and those records corresponding to the received tokens are identified. The identified node/link record forms the initial starting point of a conceptual graph which is operated on by a Steiner Matcher within Associator 12B (as will be explained) in order to identify the Steiner Tree which is then interpreted link by link by the code generator 12C. Generator 12C takes each link of the Steiner Tree and compares and matches it with the contents of a look-up table held in a still further local memory in order to reproduce the users query in formal computer language. The query in coded form is then delivered to the DBMS 13 which delivers its consequential output to the formatter 12D which formats the answer to the query for presentation to the user on the visual display device 11B of the workstation 11.

The lexical analyzer 12A may be a standard analyzer as is used in compiler construction, such as "LEX" (which is supplied with the UNIX operating system) but preferably, as described, additionally provides approximate string matching as described in "Fast Approximate String Matching" by Owolabi and McGregor, published in Software Practice and Experience Vol. 18(4), 1988 for spelling corrections which may be further enhanced by the semantic associator 12B.

As an example of this consider the query, "I've just had such a wered experience." The approximate lexical marcher is arranged to produce several alternative possibly valid matches to "wered", each being associated with a value indicative of confidence of correctness. For example, such approximate matches are "were" and "weird," etc., and the approximation marcher creates a single new node which represents all of the alternative valid matches, this new node being connected by an arc or link to each of the actual nodes representing "were" and "weird," etc., the length of the arc being representative of confidence of correctness. Thus, a high degree of confidence that the alternative match is actually correct is represented by a short arc length. The new node is then introduced as one of the nodes that must be present in the Steiner Tree. When the semantic associator 12B has identified the Steiner Tree it contains the new node and only one of the alternative possibly valid match node and it is this form of the Steiner Tree which is delivered to the code generator 12C.

Figure 2:
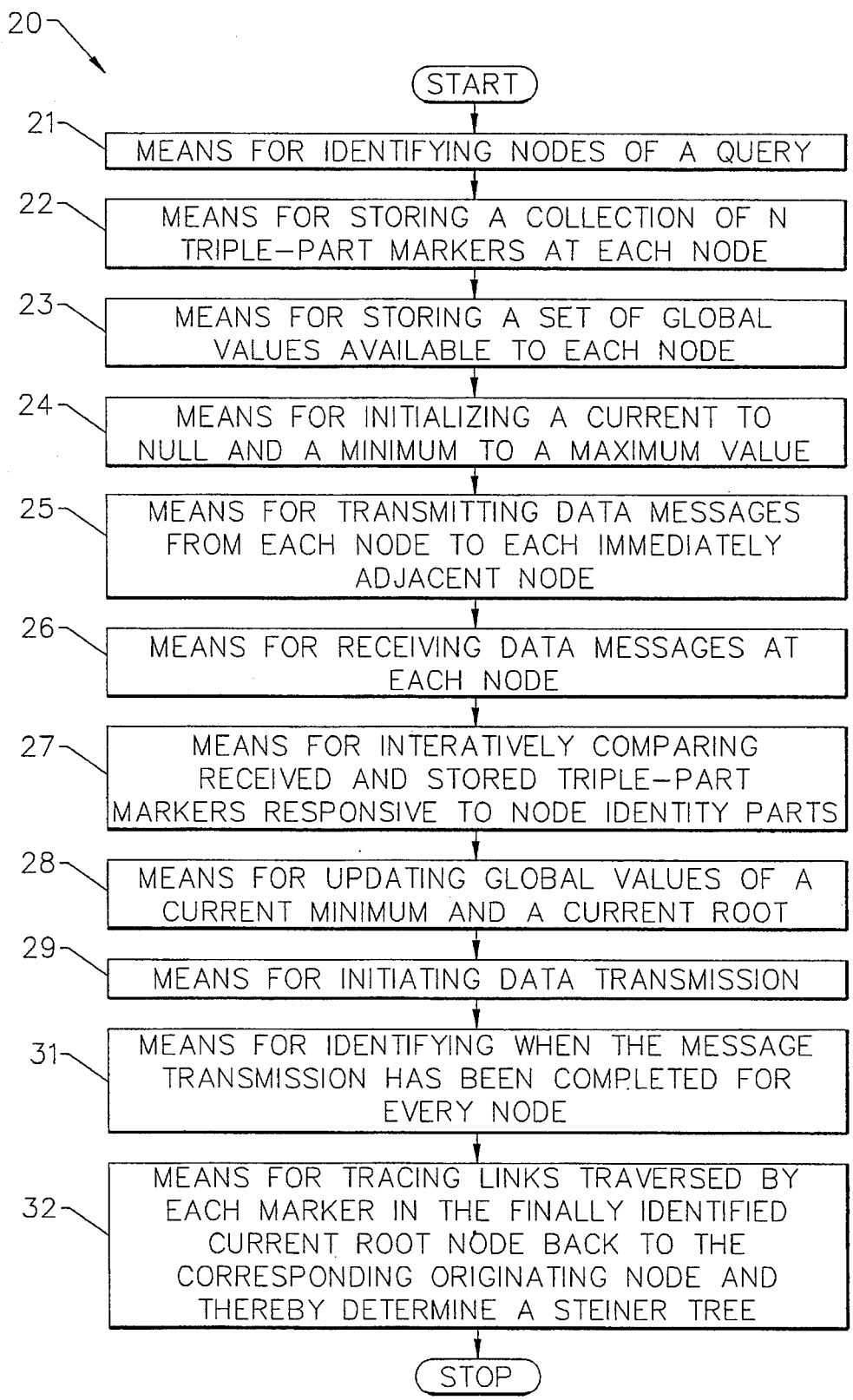
FIG. 2 schematically illustrates means for solving a Steiner Problem of a computer system according to the present invention.

As best illustrated in the schematic block diagram view of FIG. 2, the semantic associator 12B is a modified version (to be explained) of devices which are already known and which operate on a semantic basis, and it is the modified method used for solving a Steiner Problem which facilitates the substantial reduction in computational complexity provided by the intelligent interface 12 as previously referred to. The associator 12B may additionally operate at least partly on a syntactic basis, see for example "Implementing Natural Language Parsers" by Thomson and Ritchie published in Artificial Intelligence (Eisenstadt and O'Shea), 1984.

Thus, in solving a Steiner Problem 20 (see FIG. 2), the number and identity of the nodes N in the query set 21 are first identified and at least the corresponding nodes of the conceptual graph are each subjected to identical local processes involving data held in a store or memory local to each node. Each node store of the conceptual graph is initially assigned a collection of N triple part markers 22, each marker's first part identifying the marker's initial node, the second part identifying the cost to that marker of having traversed between adjacent nodes, and the third part being a pointer to the link immediately previously traversed by the marker. The initial collection of N markers has respective markers with an identity part for each of the N nodes and, for all except one marker all the cost parts and pointer parts are undefined, so that for convenience they are set to a suitable value. In the remaining marker the identity part identifies the node containing the collection and the cost and pointer parts of the marker are set to zero since that marker having not traversed even notionally has neither a pointer nor a cost. The local processor also has access to two global values 23 namely a node identifier (referred to as current root) to identify that node wherein the accumulated value for the second part of the markers is minimum (referred to as current minimum) provided that each second or cost part of these markers is defined. Initially, current root is set to null and current minimum is set to a maximal value 24. After this initialization process, each node transmits a message 25 to each of its immediate neighbors via communication channels mimicking the respective links. The traverse cost for the link is proportional to link length and each message issued by a node contains the duplicate of all the markers already stored in that node. When a node receives a message it is locally processed by iterative comparison of the respective cost parts of the markers in the message with the cost parts of the stored markers. The additional cost for the traverse of the link is shared equally by the number of markers in the message and which are used in the comparison process at each iteration. This received message is dismantled by the receiving node 26 and its markers individually compared 27 in (augmented) cost value with the markers of corresponding identity stored at the receiving node to identify and discard those received markers of greater cost than the stored markers other than when the cost part of the stored markers is undefined. The local store is updated 28 to hold for each marker identity that marker having least defined cost value.

By way of example, after the system has been operating for some time following initialization each stored marker at a node will have a defined cost value as will each received marker in the transmitted message. If N equals 6 units and the additional cost value for the traverse is 12 units then in the first iteration the comparison is between the stored cost value and the received cost value plus 2 units for each of N(=6) markers. Suppose this identifies that two received markers have greater cost than their stored equivalents, then these two received markers are discarded from future comparisons. Thus, in the second iteration the comparison is between the stored cost value of N−2 (=4) markers and the received cost value plus 12/4 =3 units for each of the 4 markers. Suppose this identifies that a further one received marker has greater cost than its stored equivalent, then this further one marker is discarded from future comparisons. Thus, in the third iteration the comparison is between the stored cost value of 3 markers and the received cost value plus 12/3 =4 units for each of the 3 markers, and so on.

When the comparison process has been completed at a node and there has been a change in the stored collection of markers that node initiates message transmission to each of its adjacent nodes provided the accumulated cost value of the stored markers in less than "current minimum."

When a node has N defined cost markers it locally computes the aggregate cost value of these markers and if this aggregate cost value is greater than the value of "current minimum" the node is inhibited from transmitting further messages. Since "current minimum" is initially set to a maximal value such as infinity the first node to compute an aggregate cost value must have this value less than "current minimum". Consequently, "current minimum" is updated to this new value and this particular node is identified as "current root." This process is repeated for each subsequent node to collect N defined cost markers. Finally, when message transmission, which is asynchronous, ceases, the node which is then "current root" is identified and, from the set of N markers therein stored, the traverse route of each stored marker is traced back to its originating node and it is this traverse route which constitutes a Steiner Tree.

Intermittently and prior to cessation of message transmission a Steiner Tree instantaneously represented by Current Root may be evaluated to establish its actual value of Current Minimum, and if this is different from the instantaneous Current Minimum value the latter is replaced by the former. The system which has been described with reference to FIG. 1 utilizes a parallel arrangement with a processor at or for each node. This function may be achieved with a single processor operating in a serial mode in which case the data-processing for each node is effected sequentially.

To speed the operation of a serial processor it is preferred to queue the processing operation by node rather than by individual messages. Thus when the messages for a particular node are processed all received messages are processed at the same time irrespective of the receipt time of the message and message transmission from that node occurs only following the processing.

The system and algorithm for solving the Steiner Problem which has been described is sufficiently accurate to the particular problem of natural language queries to provide a unique solution and it is believed that this is because, in formulating a query, human users of the system have a strong preference for avoiding ambiguity. The known method of solving the Steiner Problem only where the conceptual graph is limited in extent is capable of providing a unique solution even where the query contains an ambiguity but is very substantially more complex and requires substantially more computational power than the system and method which has been described. The known system and method operates by sending individual marker records from node to node, carrying a single token from a single named node (i.e., the marker is a single part marker), via all possible paths to all other nodes.

The present invention may be software implemented for example as set forth in the microfiche Appendix under the heading "Appendix A" which is a program designed for use with a make utility and compilers for C++, C, lex, and YACC.

For interrogation of a particular Database a Browser program for example as set forth in the Microfiche Appendix under the heading "Appendix B" is used in conjunction with the Database to establish two data files "Words" and "snet") which characterize the Database in short form and which are used by the program in the Microfiche Appendix under the heading "Appendix A " to establish direct access with the particular Database.

I claim:

1. A computer system for retrieving data stored in a database, the computer system comprising:
   an input device arranged to input a natural language query from a user thereof; and
   an intelligent interface device connected to said input device to responsively transform a natural language query received from said input device to a formal computer language of the computer system, said intelligent interface device having means for solving a Steiner Problem wherein a conceptual graph representing a database is unrestricted, said Steiner Problem solving means comprising:
   means for identifying N nodes in a query set received from the database responsive to the natural language query received from said input device,
   means in communication with said identifying means for storing a collection of N triple-part markers at each node of a conceptual graph of the database, each of said N triple-part markers including a first-part having an initial node identity, a second-part having an indication of cost to said triple-part marker in traversing between adjacent nodes, and a third-part having a pointer to a link between adjacent nodes immediately and previously traversed by said triple-part marker, and wherein said collection of N triple-part markers initially comprises N triple-part markers having said first-part identifying each of the N nodes, the respective said second-part and said third-part for N−1 of said N triple-part markers being an undefined value, and a remaining triple-part marker of said N triple-part markers having the respective said second-part and said third-part thereof set to zero, said remaining triple-part marker having an initial node identity identifying the node at which said collection is stored, means in communication with each node for storing global values which are available to each node, said global values being a node identifier to identify a current root of that node with all said second-parts being defined wherein the accumulated value for said second part of said triple-part marker is a current minimum, means in communication with said global value storing means for initializing the current root of the identified node to null and for initializing the current minimum of said second-part of said triple-part marker to a maximum value, means in communication with each of the nodes for transmitting data messages from each of the nodes to each immediately adjacent node via respective links therebetween and having a traverse cost of which is proportional to a length of the respective links, means at each adjacent node in communication with said transmitting means for receiving said data messages, each received data message containing a duplicate of all said triple-part markers stored in a transmitting node with respective said second-parts of said triple-part markers equal to a previous cost of said second-part markers and with respective said third-parts of said triple-part markers identifying the link traversed by that marker, means in communication with said receiving means and said marker storing means for iteratively comparing received and stored triple-part markers responsive to an initial node identity, the comparison being between the respective second-parts of said triple-part markers to identify and discard those received triple-part markers of greater cost than the stored triple-part markers, other than when said second-part of the stored triple-part marker is undefined, and with a predetermined number of received triple-part markers in each iterative comparison equally sharing an additional traverse cost of a particular link, and for storing a collection of N markers which are respectively of least defined cost responsive to termination of an iteration, means in communication with said comparing means for updating the current minimum and the current root when any one node has N triple part markers each having a defined second-part and having an aggregate cost value less than the previously stored value of the current minimum, means in communication with said updating means for initiating data message transmission from a node on each occurrence of a change in a stored collection of triple-part markers at that node and when that node has an accumulated cost value less than the current minimum, means in communication with said initiating means for identifying when message transmission has been completed for every node, and means in communication with said completed message identifying means for tracing the traverse of each triple-part marker in a finally identified current root node back to an originating node in order to determine a Steiner Tree.

2. A computer system as defined in claim 1, wherein said third-part of said triple-part marker of said marker storing means initially is zero and said second-part of a triple-part marker of said marker storing means initially is a comparatively corresponding large value.

* * * * *

UNITED STATES PATENT AND TRADEMARK OFFICE
CERTIFICATE OF CORRECTION

PATENT NO. : 5,471,611
DATED : November 28, 1995
INVENTOR(S) : Douglas R. McGregor It is certified that error appears in the above-identified patent and that said Letters Patent is hereby corrected as shown below:

IN THE CLAIMS:

Column 7, line 17, do not begin a new paragraph, and "second part" should be -- second-part --.

Column 8, line 15, do not begin a new paragraph, and "triple part" should be -- triple-part --.

Signed and Sealed this

Fifth Day of March, 1996

Attest:

BRUCE LEHMAN

Attesting Officer    Commissioner of Patents and Trademarks